United States Patent

Spies et al.

[11] Patent Number: 5,157,268
[45] Date of Patent: Oct. 20, 1992

[54] APPARATUS FOR TRIGGERING A PASSIVE SAFETY DEVICE FOR PROTECTING PASSENGERS IN A VEHICLE

[75] Inventors: Hans Spies, Pfaffenhofen; Alfons Woehrl, Schrobenhausen; Peter Hora, Schrobenhausen; Guenther Fendt, Schrobenhausen, all of Fed. Rep. of Germany

[73] Assignee: Messerschmitt-Boelkow-Blohm AG, Munich, Fed. Rep. of Germany

[21] Appl. No.: 625,741

[22] Filed: Dec. 11, 1990

[30] Foreign Application Priority Data

Dec. 20, 1989 [DE] Fed. Rep. of Germany ....... 3942011

[51] Int. Cl.$^5$ .................. B60R 21/08; B60R 21/16
[52] U.S. Cl. ................................ 307/10.1; 280/735
[58] Field of Search ............... 307/10.1; 340/436, 437, 340/438; 180/274, 281, 282, 286; 280/735

[56] References Cited

U.S. PATENT DOCUMENTS

| | | | |
|---|---|---|---|
| 3,762,495 | 10/1973 | Usui et al. | 280/735 |
| 3,911,391 | 10/1975 | Held et al. | 180/274 |
| 4,117,730 | 10/1978 | Spies et al. | 307/121 X |
| 4,836,024 | 6/1989 | Woehrl et al. | 307/10.1 X |
| 4,984,464 | 1/1991 | Thomas et al. | 280/735 X |
| 4,985,835 | 1/1991 | Sterler et al. | 180/282 X |
| 4,994,972 | 2/1991 | Diller | 280/735 X |

FOREIGN PATENT DOCUMENTS 2222038 11/1973 Fed. Rep. of Germany .

Primary Examiner—A. D. Pellinen
Assistant Examiner—Fritz M. Fleming
Attorney, Agent, or Firm—W. G. Fasse

[57] ABSTRACT

A passive safety device (62) is triggered for protecting vehicle passengers in the event of a collision. The output signals of a signal acceleration sensor (1) are integrated to form a signal which triggers the deployment of the safety device when a threshold value for the integrated signal is exceeded and simultaneously additional criteria are met. These conditions are met in a simple circuit with a single acceleration sensor (1), so that the entire apparatus including the safety device (62) can be installed compactly in a steering wheel of a motor vehicle. In addition to a first signal evaluation channel in which the sensor signal is integrated once, there is at least one second signal evaluation channel including two integrators (20) and (23) in which the sensor signal is integrated twice to provide a distance signal that is evaluated by a further threshold value switch (24). The safety device (62) is only triggered if both the singly integrated signal and the doubly integrated signal exceed prescribed thresholds within a prescribed time period. Additionally, a rear collision impact recognition circuit and a hammer blow impact recognition circuit (31 to 36; 41, 28) is provided to block the triggering of the safety device. A rest circuit is also provided.

11 Claims, 1 Drawing Sheet

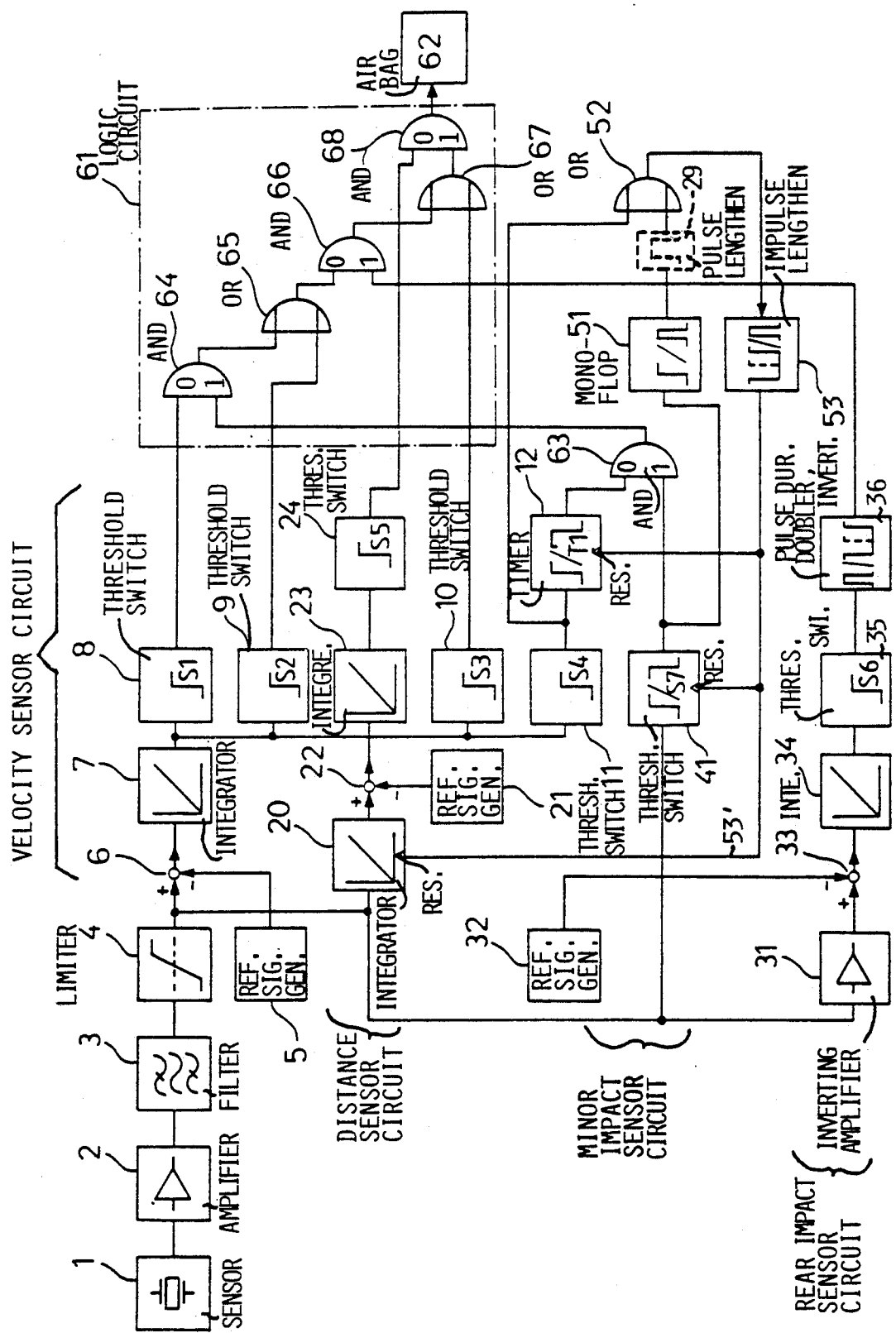

APPARATUS FOR TRIGGERING A PASSIVE SAFETY DEVICE FOR PROTECTING PASSENGERS IN A VEHICLE

FIELD OF THE INVENTION

The invention relates to an apparatus for triggering a passive safety device, such as an airbag device installed in a motor vehicle steering wheel and inflated during an accidental impact for protecting passengers in the vehicle.

BACKGROUND INFORMATION

It is generally known to use passive safety devices in motor vehicles for protecting the passengers against injuries in the event of an accidental crash or impact. Such passive safety devices include, for example, inflatable airbags and devices for tightening safety belts. It is a special goal in the art to install a triggering apparatus together with a passive safety device, such as an airbag, in the small space of a steering wheel of a motor vehicle.

German Patent Publication No.: (DE-OS) 2,222,038 discloses an apparatus for triggering passive safety devices of the above described type comprising an acceleration sensor, preferably made of a piezoelectric ceramic material. The sensor output signals exceeding a certain minimum threshold value, are integrated in an integrator circuit. If the integrated signal exceeds another threshold value provided by a threshold value circuit or threshold value switch, then the safety device is triggered. Additionally, measures must be taken to ensure that the safety device is only triggered in the case of an actual accidental crash or impact, but is not triggered in other cases, despite the generation of significant signals by the acceleration sensor. The latter case arises, for example, when a short duration, but high mechanical load acts on the acceleration sensor, but will not cause any injuries to the occupants of the vehicle because of the short duration despite its size. Such short duration accelerations can arise, for example, if the vehicle is driven over a roadside curb at a higher speed, or if the acceleration sensor senses the impact of a stone or other road debris, or by a hammer blow while the vehicle is being repaired in a workshop or even by a strong blow of a driver's hand in the case of an installation in a steering wheel. In the known apparatus described in German Patent Publication (DE-OS) 2,222,038, triggering of the passive safety device in such cases is prevented because the output signals of the acceleration sensor are amplified and filtered and then nonsymmetrically limited in their amplitude, whereby the limit value for the positive amplitude is higher than that for the negative amplitude. In this manner it is achieved that during a short duration impact of the acceleration sensor, its integrated output signal will not reach the prescribed threshold value.

Furthermore, in the known apparatus the limited output signals of the acceleration sensor are supplied to a second threshold value switch of which the output is connected to the input of an AND-gate having a second input connected to the above mentioned threshold value switch connected to the output of the integrator. The mentioned AND-gate thereby forms a logic circuit which controls the safety device which is thus triggered only if the integrated signals exceed the first threshold value and simultaneously the acceleration still remains effective on the acceleration sensor. Especially when a triggering apparatus and an airbag are installed in a steering wheel the triggering criteria for the safety device must be very precisely differentiated because the signals from an acceleration sensor mounted in the steering wheel do not reach as significant a level as those from acceleration sensors alternatively mounted in other locations of the vehicle which are more subject to direct impact forces in the case of a crash.

Other triggering devices are known which use several acceleration sensors and evaluate the signals of the acceleration sensors in several evaluation channels according to several different respective evaluation criteria, for example, for distinguishing a rear impact from a front impact or a side impact, or even a hammer blow on one of the sensors as disclosed in the above mentioned copending application U.S. Ser. No. 07/352,928. The electronic circuitry in the copending triggering apparatus is sophisticated enough to take a plurality of criteria into account and may be specially constructed to take into account special vehicle characteristics. In such apparatus the acceleration sensors are located at various significant locations in a vehicle, which locations are directly susceptible to impact in the case of a collision. However, an arrangement of several acceleration sensors in the steering wheel of a vehicle cannot achieve such advantages because the forces acting on the sensors in the case of a collision or impact, are not as significantly differentiated from one another as in the case of several impact sensors arranged at separate locations in the vehicle.

OBJECTS OF THE INVENTION

In view of the above discussion, it is the aim of the invention to achieve the following objects singly or in combination:

to construct an apparatus for triggering a safety device using only a single acceleration sensor combined with several signal evaluation channels that are so modified that precise criteria for various different impact conditions are determined in order to surely trigger a safety device only in response to appropriate collision impact conditions, but not in response to other conditions;

to construct such a triggering device with sensitive components and circuitry and in a compact manner so that it may easily be installed in a steering wheel or steering wheel hub together with the safety device such as an airbag;

to construct such a triggering device with a simple and inexpensive electronic circuit which is economical and reliable yet has the required signal evaluation channels; and to construct such a triggering device with a circuit which resets quickly, especially after evaluating non-collision impact signals.

SUMMARY OF THE INVENTION

The above objects have been achieved in an apparatus for triggering a safety device according to the invention, in which two parallel evaluation channels are provided in a triggering circuit. A first evaluation channel includes one integrator and a threshold value switch. A second evaluation channel includes two series connected integrators and another threshold value switch connected in series with the two integrators. The first of these two integrators in the second channel is constantly reset during its operation. The output of the first integrator is connected to the second integrator which is connected with its output to the second threshold value switch. Therefore, the triggering criterium for the first evaluation channel is a critical velocity while the triggering criterium of the second evaluation channel is a critical distance. The second evaluation channel may be called a delta-half-distance-recognition-circuit. Such a path distance recognition circuit is advantageous because it can distinguish the case of a collision in which the vehicle passengers are thrown or shifted forward by a great extent, from the case of mere error signals as caused by a wavy road surface, frost bulges, potholes, or roadside curbs, whereby the causes of these error signals only cause a minimal distance variation or forward shift of the passengers in the vehicle.

It is especially noteworthy, that according to the invention all of the triggering criteria are derived from the output signals of a single acceleration sensor which is made of piezoelectric ceramic material. This is true even when more than two evaluation channels are used, for example, to derive evaluation criteria representing a rear impact or an inadvertent hammer blow, etc. In this manner, for example, a simple threshold switch connected to the output of the integrator in the first evaluation channel, can detect the beginning of an impact. A timing element is connected to the output of the additional threshold value switch in the second channel in order to provide a signal which is then used to determine coincidence with the integrated signal in the first evaluation channel. A hammer impact recognition is achieved by supplying the amplified, filtered, and nonsymmetrically limited output signal of the single acceleration sensor to a respective circuit including a threshold value and a timing circuit, which also prevents the transmission of signals out of the first evaluation channel if the signal exceeds a threshold value determined by an acceleration. The resultant signals of the hammer blow recognition circuit and the resultant signal of a circuit for determining the impact null point are combined in an AND-gate, the output of which is connected to one input of the AND-gate of the first evaluation channel. The other input of the AND-gate of the first evaluation channel is connected to the output of the first threshold value switch.

The amplified, filtered, and nonsymmetrically limited output signal of the impact sensor is also processed or evaluated to produce a resultant signal relating to a rear impact of the vehicle. For this purpose the nonsymmetrically limited output signal is inverted in its polarity, amplified, compared to a lower limit value and integrated. If the integrated signal then exceeds a threshold value which indicates that a rear impact has occurred, then a timing circuit prevents the further transmission of resultant signals from the other evaluation channels by means of an AND-gate combination of the signals in the logic circuit. Finally, in cases in which resultant signals have been generated despite the fact that an actual collision or accident impact did not happen yet the safety device has been blocked, it must be assured, that the separate circuits are again reset into their initial state after a prescribed time period has elapsed in order to be ready again to trigger the safety device when necessary. The prescribed time period for resetting may, for example, be 200 ms. This time period is long enough to assure the reliable function of all the components within a desired time of at the most 40 ms in the case of an actual collision accident and, on the other hand, is short enough to largely avoid the chance of a collision occurring immediately after a desired blocking of the triggering of the safety device before the circuit has been reset.

The apparatus according to the invention is especially suitable for installation in the steering wheel or steering wheel hub of a motor vehicle and provides a rapid and reliable triggering of an airbag safety device in the event of a collision impact. The apparatus according to the invention furthermore suppresses any triggering resulting from interference or error signals which might arise from vibrations or short impacts due to driving on a poor road surface or from accidentally striking the acceleration sensor with a hammer blow or with a hand blow.

BRIEF DESCRIPTION OF THE DRAWINGS

In order that the invention may be clearly understood, it will now be described, by way of example, with reference to the single figure of the accompanying drawing which shows a schematic block circuit diagram of the apparatus according to the invention for triggering an airbag or other safety device.

DETAILED DESCRIPTION OF PREFERRED EXAMPLE EMBODIMENTS AND OF THE BEST MODE OF THE INVENTION

As shown in the figure the output signal of a single piezoelectric acceleration sensor 1 is amplified in an amplifier 2, smoothed in a filter 3, and nonsymmtrically limited in a limiter 4, whereby the limit value for the positive amplitudes is greater in magnitude than the negative limit value. A reference value generator 5 provides a first reference value to the negative input of a comparator 6 and the output of the limiter 4 is connected to the positive input of the comparator 6. If the output signal of the limiter 4 exceeds the reference value of the reference value generator 5, then the output signals of the comparator 6 are integrated in an integrator 7. The output of the integrator 7 is connected to the input of a first threshold value switch 8 in which it is compared to a first threshold value S1. If the integrated signal exceeds the first relatively low threshold value S1 then a first resultant signal is produced at the output of the threshold value switch 8 providing a velocity signal. The output of integrator 7 is furthermore connected to the input of a second threshold value switch 9 having a second threshold value S2 which is higher or greater than the first threshold value S1. If the integrated signal output of the integrator 7 exceeds the second threshold value S2, then a second resultant signal is produced at the output of threshold value switch 9.

The output of the integrator 7 is also connected to a third threshold value switch 10 having a third threshold value S3 which is higher than the second threshold value S2. If the integrated output signal of integrator 7 exceeds this third higher threshold value S3 then a third resultant signal is produced at the output of the third threshold value 10.

The output of the integrator 7 is additionally connected to a fourth threshold value switch 11 having a very low fourth threshold value S4 which is lower than the first threshold value S1. If the integrated output signal of the integrator 7 exceeds this very low threshold value S4, then the output of the threshold value switch 11 activates a resettable threshold switch and timing element 12 in the form of an RS-flip-flop that normally provides at its output a high signal (1). However, this output signal of the timing element 12, falls off to a low signal (0) after a prescribed period of time T1.

The output signal of the timing element or RS-flip-flop 12 forms a fourth resultant signal.

In a second evaluation channel forming a distance sensor circuit, the nonsymmetrically limited signal of the single acceleration sensor 1 is integrated in a first integrator 20. A second reference value in the form of an output signal of a reference generator 21 is applied to the negative input of a difference or summing element 22 while the output of the first integrator 20 of the second channel is applied to the positive input of the summing element 22. The output signal of the summing element 22 is integrated in a second integrator 23 of the second channel which is normally constantly reset by the constant application of the second reference value of the reference value generator 21, so that normal signal noise occurring during driving as well as error signals arising in the sensor electronics, for example, due to construction tolerance or leakage currents do not lead to any integrated output signal from the integrator 23. The output signal of the second integrator 23 corresponds to a critical distance signal which is then applied to a fifth threshold value switch 24 having a fifth threshold value S5. The output signal of this fifth threshold value switch 24 is a fifth resultant signal.

The nonsymmetrically limited output signal of the single acceleration sensor 1 is also applied to a further evaluation channel which forms a rear impact recognition or sensor circuit comprising an inverting amplifier 31 which inverts the polarity of and amplifies the nonsymmetrically limited output signal of the single acceleration sensor 1. The output signal of the inverting amplifier 31 is applied to the positive input of a difference or summing element 33 which subtracts a third reference value provided by a reference signal generator 32. The output signal of the summing element 33 is then integrated in integrator 34. If the integrated signal exceeds the threshold value S6 of a sixth threshold value switch 35 connected to the output of the integrator 34, then the output of integrator 34 or rather of the sixth threshold switch drives an inverting impulse length doubler 36 which inverts the polarity and doubles the duration or length of the output impulse signal of the threshold value switch 35. The output signal of the inverting impulse length doubler 36 is a sixth resultant signal.

A further signal evaluation channel forming a hammer blow recognition or sensor circuit circuit is included in the triggering circuit according to the invention. The output of the nonsymmetric limiter 4 is connected to the input of a seventh threshold value switch 41 having a threshold value S7. This threshold value switch 41 is, for example, a resettable RS flip-flop with a threshold value switch at the input and an inverter at the output. Normally, the output of this seventh threshold value switch 41 is a high signal (1) which switches to a low signal (0) when the threshold value S7 of the threshold value switch or RS-flip-flop 41 is exceeded. The output signal of this threshold value switch 41 provides a seventh resultant signal. The threshold value switch 41 distinguishes between collision impacts and minor impacts such as a hammer blow and thus functions as a minor impact sensor circuit.

Furthermore, a resetting circuit 53 is provided for the timing element 12, for the integrator 20, for the threshold value switch 41, and, for any other resettable circuit components. The reset signal is derived from the output of the limit or threshold value switch 41 which is connected to a mono-flop 51. When necessary, the output of the mono-flop 51 is connected to an impulse lengthening element 29 or is connected directly to one input of an OR-gate 52. The output of OR-gate 52 is connected to an impulse lengthening element 53 which produces at its output the reset signal. The specific connection and operation of this part of the circuit is described in more detail below in the description of the function.

The above described resultant signals are all used as input signals to a logic circuit 61, where they are logically combined in such a manner that an airbag 62 or other safety device is only triggered and deployed in the case of an actual collision impact of the motor vehicle, but not deployed in all other cases, such as curbstone impacts, hammer blows, etc. Before being input to the logic circuit 61, the fourth resultant signal output from the timing element 12 and the seventh resultant signal output from the threshold value switch 41 are combined in an AND-gate 63. The output of the AND-gate 63 is input to the logic circuit 61.

Logic circuit 61 comprises an AND-gate 64 which receives as inputs the combined resultant signal output from the AND-gate 63 and the first resultant signal output from the threshold value switch 8. An OR-gate 65 receives as inputs the output of the AND-gate 64 and the second resultant signal output from the threshold value switch 9. An AND-gate 66 has as inputs the output of OR-gate 65 and the sixth resultant signal output from the pulse duration lengthening element 36. Another OR-gate 67 receives as inputs the output of AND-gate 66 and the third resultant signal output from the threshold value switch 10. The last logic stage of the logic circuit 61 is an AND-gate 68 receiving as inputs the output from OR-gate 67 and the fifth resultant signal output from threshold value switch 24. The output of AND-gate 68 is used as the trigger signal for activating, for example a gas generator for an airbag 62 or some other safety device e.g. a seat belt tightener.

The above described embodiment of the apparatus according to the invention functions in the following manner in the event of a collision impact of the motor vehicle. The output signal of the acceleration sensor 1 is amplified in the amplifier 2, filtered in filter 3 and nonsymmetrically limited in the nonsymmetrical limiter 4. When any signal value of the amplified smoothed and limited signal exceeds a prescribed threshold value as determined by the reference signal from the first reference generator 5, the respective signal above the reference threshold is integrated in the integrator 7. As soon as the integrated signal reaches the lowest fourth threshold value S4 the threshold value switch 11 closes a circuit to activate the timing element 12 so that the output of the timing element 12 which is normally a high signal (1) falls to a low signal (0) after a time duration T1 of, for example, 25 ms. During the first 25 ms after recognition of the beginning of an impact by the closing threshold value switch 11, a high signal (1) forming the fourth resultant signal, is applied to one input of the AND-gate 63. This high signal falls off to a low signal (0) after the first 25 ms.

The amplified smoothed, and nonsymmetrically limited signal of the acceleration sensor 1 is also applied to the threshold value switch 41 which forms a hammer blow recognition circuit. The output signal of the threshold value switch 41 is normally a high signal (1) when the threshold value S7 is not exceeded. Because the output of switch 41 is normally high (1) and is applied to the second input of AND-gate 63, the AND-gate 63 switches through a high signal which is applied to the second input of AND-gate 64. If the amplified, filtered, and nonsymmetrically limited signal of the acceleration sensor 1 exceeds the threshold value S7 of the threshold value switch 41, that would indicate that an unallowably high force has been applied to the acceleration sensor, for example, by a hammer blow or a hand blow striking the steering wheel. In that case, the threshold value switch 41 would be triggered so that its output would fall off to a low signal (0), whereby the AND-gate 63 would be blocked so as to provide a low signal to AND-gate 64 which would then also be blocked.

The first input of AND-gate 64 receives the first resultant signal S1 as an output from the threshold value switch 8. If the acceleration sensor's nonsymmetrically limited signal integrated by integrator 7 above a certain lower limit, exceeds the first threshold value S1 then the threshold value switch 8 outputs a high signal (1) and the AND-gate 64 closes a circuit to switch through a signal whereby an output signal also appears at the output of the following OR-gate 65. However, an output signal appears at the following AND-gate 66 only if the sixth resultant signal S6 is also a high signal (1), namely, when the output of duration lengthener element 36 indicates that a rear collision impact has not been detected. In this case the nonsymmetrically limited signal of the acceleration sensor 1 has been inverted and further amplified in the amplifier 31 and any signal value above a threshold determined by the third reference generator 32 is integrated in the integrator 34. Such an integration of a signal occurs only when a "negative" acceleration force is effective on the acceleration sensor 1, which is the case only if the motor vehicle is impacted in a collision from the rear. In such a case, the safety device is not to be triggered. However, because of the filtering of the output signal of the acceleration sensor 1, in the case of shock wave shaped input signals, the filtered signals may exhibit an overshooting characteristic so that a false signal amplitude may arise during a rear impact, which "over-shooting" corresponds to a front impact. In such a case, the safety device must also not be triggered. This type of triggering is prevented by means of the impulse duration doubling circuit 36. If the "over-shooting" integrated signal exceeds threshold S6 of the sixth threshold value switch 35, then the normally high signal (1) output of the sixth resultant signal from the doubling circuit 36 drops to a low signal (0), and thus blocks the AND-gate 66. Such blocking of the AND-gate 66 is maintained twice as long as the duration of the output signal of the sixth threshold value switch 35.

Therefore, as described above, if neither a rear impact signal nor a hammer blow signal exists, and the first resultant signal output by the first threshold value switch 8 is produced within the time span T1, namely, approximately 25 ms after the detection of the beginning of an impact, then this first resultant signal will be passed through AND-gate 64, 65, and 66 to be applied to one input of the last AND-gate 68. If instead the first resultant signal does not arise within the time period T1, that is to say, if the first threshold value S1 of the first threshold value switch 8 is not exceeded within the first 25 ms, then no signal will appear at one input of AND-gate 68 and the safety device 62 will not be triggered.

The AND-gate 64 is blocked after the time period T1, as described above, so that the safety device 62 cannot be triggered when the impact forces on the acceleration sensor 1 are so minimal that the passengers of the vehicle could withstand the forces without injury. If the vehicle is involved in a collision impact after the time period T1, the safety device will be triggered, however, only if the threshold value S2 of the second threshold value switch 9 is exceeded by the integrated limited output signal of the acceleration sensor 1. In such a case when the threshold value S2 is exceeded, the second resultant signal output by threshold value switch 9 passes through the OR-gate 65 and the following AND-gate 66 and the following OR-gate 67 to one input of the final AND-gate 68. In order that the safety device 62 is reliably triggered in all collision impacts which require the protection of the passengers by the safety device, the threshold values S1, S2, and also S3 are set to such levels that they are always exceeded by the respective input signals in any normal or typical collision impact.

The second input of AND-gate 68 receives the fifth resultant signal which is the output signal of the so-called delta-distance recognition circuit. In this delta-distance recognition circuit, the nonsymmetrically limited output signal of the acceleration sensor 1 is integrated twice in integrators 20 and 23, so that the final output signal of the second integrator 23 corresponds to a distance signal. If this distance signal exceeds a critical threshold value S5, then the fifth threshold value switch 24 closes, so that its output signal, the fifth signal, becomes a high signal (1) which is applied to one input of the AND-gate 68. In this condition the safety device 62 will be triggered.

The signal evaluation for producing the third resultant signal is independent of the signal processing for producing the sixth resultant signal which indicates a rear collision impact. The third threshold value switch 10 has a relatively high activation threshold S3 which is exceeded in the case of a frontal or other collision occurring immediately after a rear collision impact, so that the safety device must be triggered to provide protection during the frontal impact. Directly after the rear collision impact neither the first nor the second resultant signal will pass through the circuit, so that the third resultant signal must be produced in order to trigger the safety device in this exceptional case of two collision impacts occurring in immediate succession. This third resultant signal is evaluated by passing through the OR-gate 67 and by being applied to the AND-gate 68 along with the fifth resultant signal. In other words, the third resultant signal is evaluated with the delta-distance recognition signal.

Thus, for a normal or typical collision impact the simply integrated signal of the acceleration sensor 1 is evaluated by the threshold value switches 8 and 9, so that the first and second resultant signals produced by the switches 8 and 9, so to speak, prepare for the activation of the safety device 62. The actual triggering of the safety device 62 is then achieved if a critical distance is exceeded as determined in the distance recognition channel, including the two integrators 20 and 23 which provide a signal if a critical distance represented by a threshold value S5, has been exceeded.

The timing elements 12 and 41 and the integrator 20 must be reset each time after the beginning of an impact has been detected and also each time the hammer blow detection circuit is activated. Correspondingly, the output S4 of the fourth threshold value switch 11 is connected to one input of the OR-gate 52. The signal present at the output of threshold value switch 11 after the beginning of an impact, is conducted through the OR-gate 52 to the input of an inverting impulse duration lengthening element 53. This high signal (1) applied to the input of the impulse lengthening element 53 causes the output of the element 53 immediately to drop to a low signal (0) which is maintained at the output of the impulse lengthening element 53 for a relatively long duration of, for example 200 ms, after the activation at the input of element 53. The impulse lengthening element 53 can be similarly activated by the output signal of the seventh threshold value switch 41 when it recognizes or indicates a hammer blow impact. For this purpose, the output of the threshold value switch 41 is applied to the input of a mono-flop 51 which produces an output signal in response to a falling edge of the signal at its input. The output signal from mono-flop 51 is a short time duration positive impulse which may be lengthened in its time duration by a lengthening element 29 if that should become necessary for passing through the OR-gate 52 to the input of the impulse lengthening element 53 in order to activate the element 53 as described above. The impulse lengthening element 53 is retriggerable.

The output of the impulse lengthening element 53 is a reset signal which is applied to a reset input RS of the threshold value switch 41 combined with a timing element, of the integrator 20, and to the reset input of the timing element 12, respectively. In this manner these circuit components 41, 20, and 12 are reset after a delay, namely after approximately 200 ms. Such a delayed resetting is necessary for the resetting of all the separate signal evaluation and recognition circuits into a defined initial starting condition within a defined time duration after recognition of the occurrence, of, for example, a large pot-hole or a roadside curb being struck by the vehicle, or alternatively, a hammer blow or hand blow being applied so as to be sensed by the acceleration detector.

Although the invention has been described with reference to specific example embodiments it will be appreciated that it is intended to cover all modifications and equivalents within the scope of the appended claims.

What we claim is:

1. A circuit arrangement for triggering a safety device for protecting passengers in a motor vehicle in response to a collision, comprising a single collision acceleration sensor (1), a first signal evaluating channel connected to an output of said sensor and including first means for evaluating an acceleration sensor output signal to produce a velocity signal, a second signal evaluation channel connected to said output of said sensor and including second means for evaluating said acceleration sensor output signal to produce a distance signal, and a logic circuit stage (61) for combing said velocity signal and said distance signal to selectively produce an output trigger signal for selectively triggering said safety device, said circuit arrangement further comprising a minor impact sensor circuit (41), and a rear impact sensor circuit (31 to 36), and wherein said first means of said first signal evaluation channel comprises a first integrator (7) connected in series with an arrangement of a plurality of threshold value switches, and wherein said logic circuit stage (61) comprises a first AND-gate (64) receiving as a first input, an output from a first threshold value switch (8) of said plurality having a low threshold value, said first AND-gate (64) receiving as a second input, a combined signal including an output of said minor impact sensor circuit and for a prescribed time duration an output of a timing circuit (12) for detecting a beginning of an impact, a first OR-gate (65) receiving as a first input, an output signal of said first AND-gate (64) and as a second input, an output signal of a second threshold value switch (9) of said plurality of threshold value switches in said first signal evaluation channel, a second AND-gate (66) receiving as a first input, an output signal of said first OR-gate (65) and as a second input, an output signal of said rear impact sensor circuit (31 to 36), a second OR-gate (67) receiving as a first input, an output signal of said second AND-gate (66) and as a second input, an output signal from a third threshold value switch (10) of said plurality of threshold value switches having a high threshold value, and a third AND-gate (68) receiving as a first input, an output signal from said second OR-gate (67) and as a second input, an output signal from said second signal evaluation channel, whereby an output signal of said third AND-gate (68) forms said output trigger signal for selectively triggering said safety device.

2. The circuit arrangement of claim 1, wherein said first integrator (7) is connected for integrating said acceleration sensor output signal to provide said velocity signal to said threshold value switch (8) for selectively conducting said velocity signal, wherein said second means of said second signal evaluation channel comprising a second integrator (20) for integrating said acceleration sensor output signal, means (21) for generating a second channel reference value, comparator means (22) for subtracting said second channel reference value from an output signal of said second integrator (20), a third integrator (23) for integrating an output signal from said comparator means (22) in said second channel, a fourth threshold value switch (24) for selectively conducting said distance signal of said third integrator (23), and wherein said first and third AND-gates (64, 68) combine said velocity signal and said distance signal to form said output trigger signal.

3. The circuit arrangement of claim 1, wherein said single acceleration sensor comprises a piezoelectric ceramic material sensor.

4. The circuit arrangement of claim 1, further comprising an amplifier (2), a filter (3) and a non-symmetrical signal limiter (4) connected in series with each other and with said single acceleration sensor for providing said acceleration sensor output signal as an amplified, filtered, nonsymmtrically limited signal.

5. The circuit arrangement of claim 1, wherein said first evaluation channel further comprises means (5) for generating a first channel reference value, comparator means (6) for subtracting said first channel reference value from an output signal of said single sensor, and wherein said first threshold value switch (8) and said second threshold value switch (9) are both connected to receive said velocity signal as a first channel integrator output signal, wherein each of said first and second threshold value switches (8, 9) comprises a respective threshold value which si exceeded by said first channel integrator output signal during a collision impact of said vehicle, wherein a first threshold value of said first threshold value switch (8) is lower than a second threshold value of said second threshold value switch (9), said circuit arrangement further comprising timing circuit means (11, 12) for blocking an output of said first threshold value switch (8) after a prescribed time period has elapsed since the beginning of a collision impact.

6. The circuit arrangement of claim 5, wherein said timing circuit means comprises a timing threshold value switch (11) having a low threshold value, said timing threshold value switch (11) being connected to said first channel integrator output signal, a timing element (12) connected to an output of said timing threshold value switch (11), a fourth AND-gate (63) connected with one input to said timing element (12), and wherein said first AND-gate (64) of said logic circuit stage (61) comprises two inputs one of which is connected to an output of said fourth AND-gate (63) and the other input being connected to an output of said first threshold value switch (8), and wherein said timing element (12) is activated for a prescribed time period when said first channel integrator output signal exceeds said low threshold value of said timing threshold value switch (11).

7. The circuit arrangement of claim 1, wherein said third threshold value switch (10) has a third threshold value higher than a threshold value of said second threshold value switch (9), and wherein an output signal of said third threshold value switch (10) is connected to one input of said second OR-gate (67) which is connected with its other input to an output of said second AND-gate (66), and means connecting an output of said second OR-gate (67) to said third AND-gate (68) which combines said velocity signal and said distance signal.

8. The circuit arrangement of claim 1, wherein said minor impact sensor circuit for recognizing impact forces sensed by said single acceleration sensor (1) for preventing the indication of a collision impact if only a minor impact occurred, comprises resettable flip-flop means (41) for receiving an acceleration sensor output signal, and wherein an output signal of said resettable flip-flop means (41) is effective to selectively block said velocity signal in said logic circuit stage when a minor impact occurs.

9. The circuit arrangement of claim 1, wherein said rear impact sensor circuit for recognizing impact forces which indicate the occurrence of a rear collision impact on said vehicle, comprises an inverting amplifier (31) receiving an acceleration sensor output signal from said single sensor, means (32) for generating a rear impact reference value, comparator means (33) for subtracting said rear impact reference value from an output signal of said inverting amplifier, an integrator (34) connected to an output of said comparator (33), a rear impact threshold value switch (35) having a rear impact threshold value, said rear impact threshold value switch being connected to an output of said integrator (34), and an inverting impulse duration extender (36) connected to an output of said rear impact threshold value switch, whereby an output signal of said impulse duration extender is effective to selectively block said velocity signal in said logic circuit stage when a rear impact occurs.

10. The circuit arrangement of claim 5, further comprising reset circuit means for resetting after a delay time said timing circuit means.

11. The circuit arrangement of claim 10, further comprising reset circuit means for resetting after a delay time said resettable flip-flop means of said minor impact sensor circuit.

* * * * *

UNITED STATES PATENT AND TRADEMARK OFFICE
CERTIFICATE OF CORRECTION

PATENT NO. : 5,157,268
DATED : October 20, 1992
INVENTOR(S) : Hans Spies et al.

It is certified that error appears in the above-identified patent and that said Letters Patent is hereby corrected as shown below:

```
Item [57] Abstract, line 23, replace "rest" by --reset--;
Column 9, line 53 in claim 1, replace "combing" by --combining--
Column 10, line 46 in claim 4, replace "nonsymmtrically" by
                                --nonsymmetrically--;
Column 10, line 57 in claim 5, replace "si" by --is--;
Column 12, line 26 in claim 11, replace "10" by --8--.
```

Signed and Sealed this

Fifth Day of October, 1993

*Attest:*

BRUCE LEHMAN

*Attesting Officer*     *Commissioner of Patents and Trademarks*